March 12, 1929.  F. E. MARCY  1,704,986
SPIKED LAWN ROLLER
Filed Aug. 1, 1927   2 Sheets-Sheet 1

Inventor:
Frank E. Marcy,
By Byrnes, Townsend & Brickenstein,
Attorneys

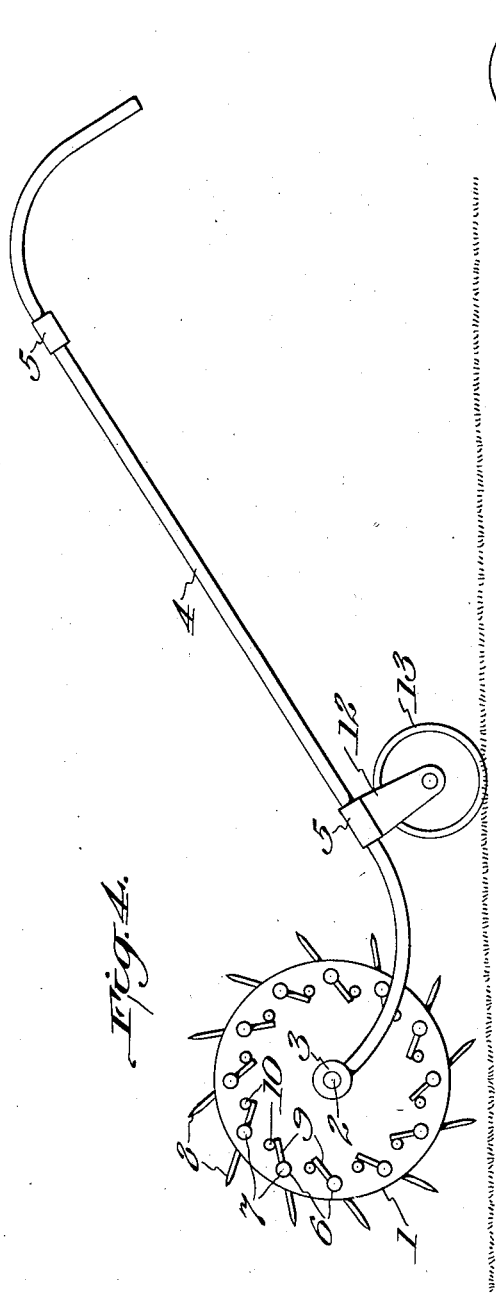
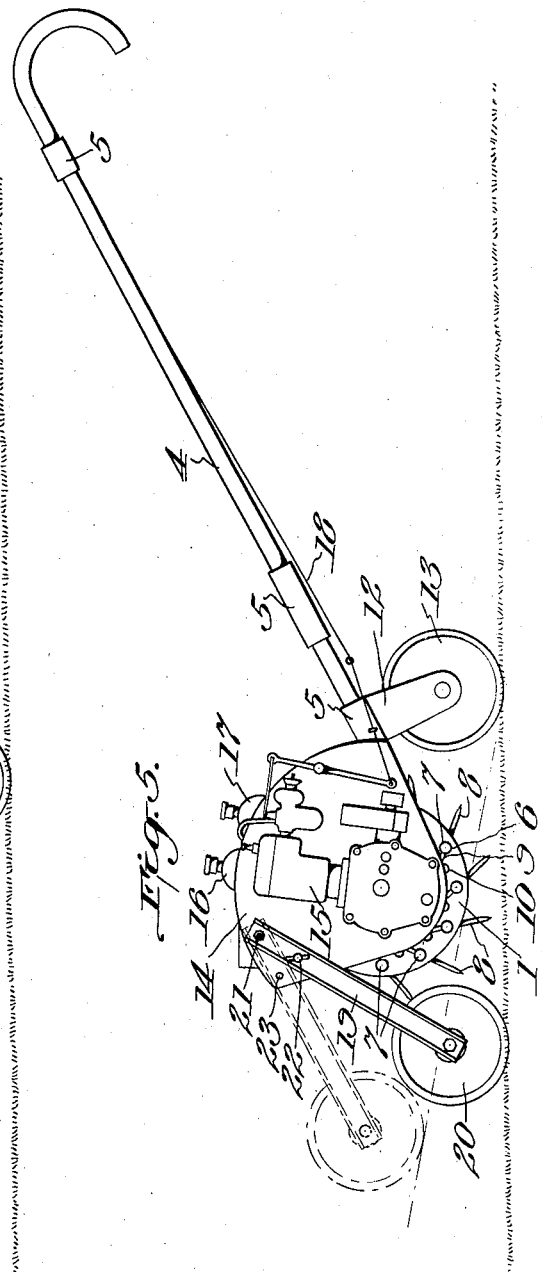

Patented Mar. 12, 1929.

1,704,986

UNITED STATES PATENT OFFICE.

FRANK EARL MARCY, OF SAN DIEGO, CALIFORNIA.

SPIKED LAWN ROLLER.

Application filed August 1, 1927. Serial No. 209,948.

In the upkeep of lawns, and particularly of the putting greens of golf courses, it has been found beneficial to puncture or perforate the turf and top soil so that the moisture from dew, rain, sprinkling or watering may more easily penetrate the soil and reach the roots of the grass. These holes or perforations also permit the air readily to enter the soil and, furthermore, they provide means for introducing humus or fertilizer into the soil.

For the purpose of thus perforating the turf, spiked rollers have come into rather extensive use, particularly in regions where, owing to a lack of proper climatic and weather conditions, the growing of suitable stands of grass on lawns and golf greens is a problem.

Such rollers are of a size to be easily operated by hand and the rollers proper thereof have their peripheral faces provided with spikes fixed thereon and projecting radially therefrom.

These spikes being fixed relatively to the ground-contacting face of the roller enter and leave the turf at such an angle as to tear it, and in order to avoid detrimental tearing and possible injury to the turf in this manner, the spikes are placed at relatively great distances from each other and are comparatively short. For example, in rollers with which I am familiar the roller proper is approximately twelve inches in diameter and eighteen inches long, and its spikes are arranged in axial parallel rows, the spikes in each row being about two inches from those in adjacent rows and about one and one-half inches long. Therefore, when the roller is moved over the ground the perforations formed in the turf by its spikes will be two inches apart and one and one-half inches deep.

It has been found that if the perforations in the lawn are made relatively deep and relatively close together the turf responds more readily to the fertilization and watering, and it is the object of my invention to produce a lawn roller, either hand or motor operated, in which long spikes arranged in close proximity to each other are used, the spikes being so mounted upon the roller as to enter and leave the turf without tearing or otherwise injuring it.

My invention consists in a lawn roller provided with a plurality of spikes so mounted as to enter and leave the turf at such an angle thereto as to prevent tearing thereof, as I will now proceed to explain further and finally claim.

In the accompanying drawings illustrating the invention, in the several figures of which like parts are similarly designated, Fig. 1 is a side elevation of a hand-propelled lawn roller embodying my invention;

Fig. 4 is a view similar to Fig. 1, but showing the roller proper out of contact with the ground;

Fig. 5 is a side elevation of a modified form of my invention in which the roller is motor-driven.

Figure 1:
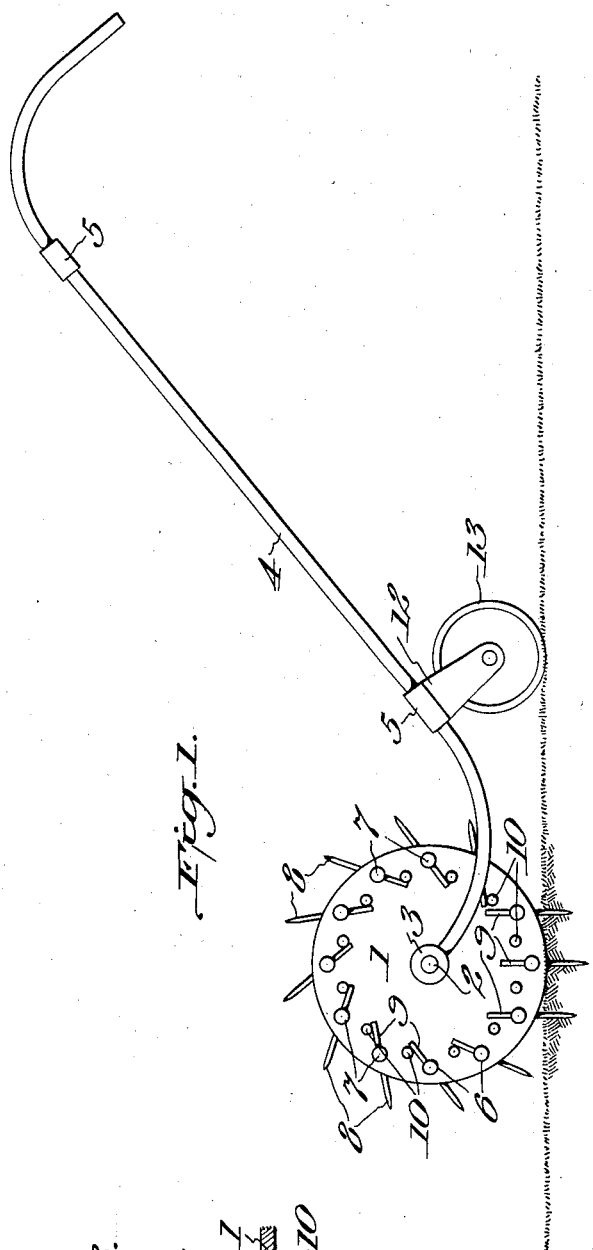
Figure 3:
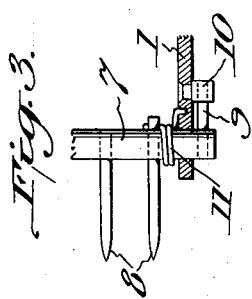
Fig. 3 is a fragmentary detail, upon a larger scale, of the mounting of one of the spike-carrying shafts.
Figure 2:
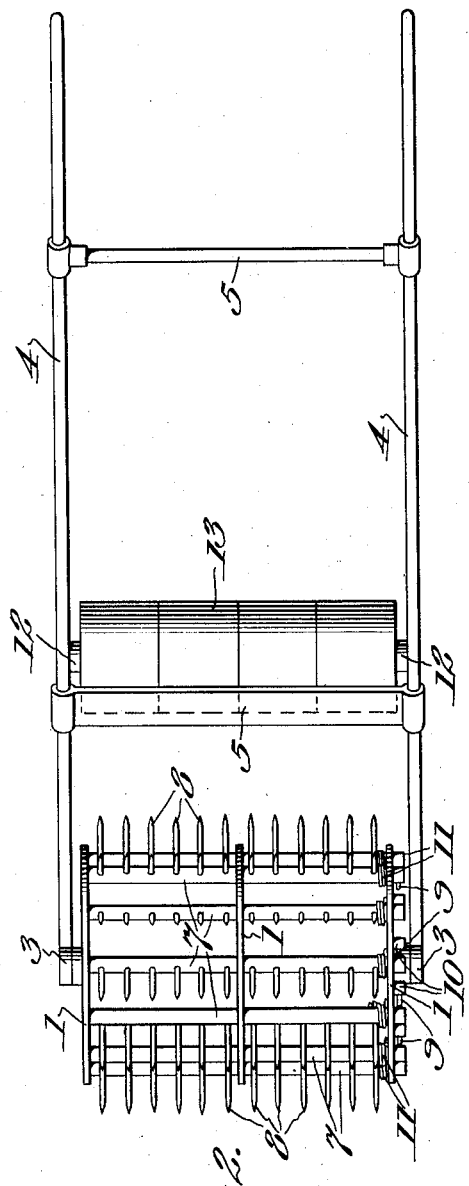
Fig. 2 is a top plan view thereof.

It will be understood that whether the lawn roller is hand-propelled, as illustrated in Figs. 1 to 4, or motor-driven, as illustrated in Fig. 5, the essential features of the roller proper are the same and operate in the same manner.

The roller structure or roller-proper comprises a plurality, preferably three, of circular discs 1 arranged in suitable spaced relation to each other and mounted on an axle 2 carried in bearings 3 of a frame composed of shaft or handle members 4 and spacers or struts 5. Mounted in suitable circumferentially arranged bearings 6 in the discs 1 are a plurality of shafts 7, each of which carries a plurality of suitably spaced spikes 8 which extend outwardly beyond the circumference of the roller structure. One end of each shaft 7 extends through and projects beyond the outer face of one of the outer discs 1 and each of these projecting ends carries a pin 9 arranged for cooperation with a stop 10 fixed relatively thereto. The pins 9 are held normally in engagement with the stops 10 by means of helical springs 11 or other appropriate resilient or yielding members. The angular position assumed by the spikes, when the pins 9 and stops 10 are in the normal contacting position under the influence of the springs 11, is such that during travel of the roller they will enter the turf of the lawn substantially normal thereto and without danger of tearing or otherwise injuring it. Moreover, as the roller travels forward with the spikes extending into the turf the shafts 7 will turn in their bearings 6 and will permit the spikes 8 to maintain their initial imbedded positions relatively to the turf until they are entirely withdrawn therefrom. When the spikes 8 are withdrawn from the turf the springs 11 will immediately return them to their normal positions by rotating the shafts 7 successively until the pins 9 contact with the stops 10, thus positioning them ready for reentrance into the turf as the roller progresses over the lawn.

Mounted in suitable bearings 12 carried by the shafts or handle members 4 of the frame at such a distance from the roller structure as to form a desirable fulcrum is a follower-roller 13, preferably formed of a plurality of similar members to give it a differential turning action. This follower-roller 13, in addition to rolling the turf in the wake of the spiked roller, is used as a fulcral point upon which the spiked roller may be raised (as illustrated in Fig. 4) and turned when its direction of travel is to be changed, the spikes being thereby withdrawn from and raised out of contact with the turf.

It will be apparent from the foregoing description that by providing spikes which enter, remain in, and are withdrawn from the turf at the same angle, normal to the surface of the ground, I am enabled to use relatively long spikes as compared with those at present employed in lawn rollers of the known types, without danger of tearing or otherwise injuring the turf, the length of such spikes being limited only in proportion to the diameter of the discs 1 and the proximity of the centers of the shafts 7 around the circumference. For example, in a roller having discs twelve inches in diameter, I can effectively employ spikes having a three inch penetration and carried by shafts arranged at one and one-half inches between centers. Obviously, lawn rollers constructed in accordance with my invention may be of any width which may be effectively handled by an operator.

As hereinbefore indicated the device may be motor driven, as illustrated in Fig. 5, and in such case I modify the frame somewhat in order to accommodate the motor and its necessary adjuncts.

Referring to Fig. 5, it will be seen that all of the elements of the lawn roller, as illustrated in Figs. 1 to 4 are retained, but I add thereto side plates 14 fixed to the frame, and on one of these I mount the motor 15, preferably a small internal combustion engine, which has a direct or an indirect drive connection with the axle 2, for example through a suitable clutch, no shown. Between the side plates 14, and above the spiked roller unit or strucutre, I mount the gasoline tank 16 and cooling-water tank 17. Suitable clutch and throttle controls, the latter of which is indicated at 18, are led up the handle members 4 to within easy reach of the operator.

In order that the motor driven roller may be easily moved from place to place, as from one putting green to another, I provide the swinging frame 19 carrying rollers 20. This frame is pivoted at 21 to the side plates 14 and may be fixed either in the full line or operative position wherein the spiked roller is raised to clear the ground, or in the broken line or inoperative position wherein the spiked roller is operating, by means of a pair of thumb screws 22 or the like which cooperate with suitably located holes 23 in the side plates 14.

My lawn roller, whether of the hand-operated or motor-driven type, may be provided with a fertilizer distributor or spreader, or a sprinkler, or both, whereby the turf in the wake of the spiked roller may be supplied with fertilizer or water, or fertilizer and water, so that the holes produced in the turf and top soil may immediately be made effective to enrich the soil, and improve the turf. Other changes and additions may of course be made within the spirit of the invention and the scope of the following claims.

I claim:

1. In a lawn roller, a roller structure including a plurality of transverse shafts pivotally mounted circumferentially about the axis of the roller, each of said shafts provided with a plurality of spikes, a resilient member encircling each of said shafts and connected therewith and with the roller for imparting movement to said shafts in one direction, and means carried by said shafts and engageable with relatively fixed means carried by said roller for limiting such movement, whereby the spikes carried by said shafts will be so positioned relatively to the periphery of the roller as the same travels over a lawn as to enter the turf thereof substantially normal thereto, the resiliency of said resilient members permitting withdrawal of the spikes from the turf at such an angle thereto as to prevent tearing thereof.

2. In a lawn roller, a roller structure including a plurality of carrier discs, an axle on which said discs are mounted, a frame in which said axle is mounted and whereby said roller may be guided over a lawn, a plurality of shafts pivotally mounted in said discs and each provided with a plurality of spikes extending outwardly from the periphery of said roller structure, and a helical spring encircling each of said shafts, each of said springs having one of its ends fixed to its respective shaft and its other end fixed to one of said discs so that a torque is exerted upon each of said shafts, whereby during the travel of said roller over the lawn the spikes will enter the turf substantially normal thereto, the resiliency of said springs permitting withdrawal of the spikes at such an angle to the turf as to prevent tearing thereof.

3. In a lawn roller, a roller structure including a plurality of carrier discs, an axle on which said discs are mounted, a frame in which said axle is mounted and whereby said roller may be guided over a lawn, a plurality of shafts pivotally mounted in said discs and each provided with a plurality of spikes extending outwardly from the periphery of said roller structure, a helical spring encircling each of said shafts, each of said springs having one of its ends fixed to its respective shaft and its other end fixed to one of said discs so that a torque is exerted upon each of said shafts, and means for limiting the pivotal movement of each of said shafts under the influence of its spring, whereby during the travel of said roller over the lawn the spikes will enter the turf substantially normal thereto, the resiliency of said springs permitting withdrawal of the spikes at such an angle to the turf as to prevent tearing thereof.

In testimony whereof, I affix my signature.

FRANK EARL MARCY.